United States Patent
Donahoe et al.

(10) Patent No.: US 7,362,657 B1
(45) Date of Patent: Apr. 22, 2008

(54) AQUATIC OBJECT DETECTION AND DISRUPTION SYSTEM

(75) Inventors: Patrick Donahoe, San Diego, CA (US); Dana Cottrell, El Cajon, CA (US); David Keir, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/725,714

(22) Filed: Mar. 20, 2007

(51) Int. Cl.
*H04B 11/00* (2006.01)
(52) U.S. Cl. .................................. 367/136; 367/134
(58) Field of Classification Search ................ 367/136, 367/128, 95, 134
See application file for complete search history.

(56) References Cited

U.S. PATENT DOCUMENTS

2006/0132189 A1* 6/2006 Holt et al. ................... 327/24

* cited by examiner

*Primary Examiner*—Dan Pihulic
(74) *Attorney, Agent, or Firm*—Peter A. Lipovsky; J. Eric Anderson; Ryan J. Friedl (57) ABSTRACT

A system includes a receive line array that generates one or more receive line array signals, a processor operatively connected to the receive line array to process the receive line array signals and to generate detonation signals based upon the processed receive line array signal, and a modem operatively connected to the processor that transmits the detonation signals to one or more explosive line arrays, the explosive line arrays having at least one explosive charge coupled thereto that is detonated upon receipt of the detonation signals. The receive line array may include multiple sensors and multiple hydrophones. The sensors may be magnetic field, electric field, or electromagnetic sensors. The explosive line arrays may be detection line arrays or disruption line arrays. The modem may be configured to receive and transmit one or more user-initiated detonation signals to the disruption line arrays to detonate the disruption line arrays.

25 Claims, 5 Drawing Sheets

AQUATIC OBJECT DETECTION AND DISRUPTION SYSTEM

FEDERALLY-SPONSORED RESEARCH AND DEVELOPMENT

The Aquatic Object Detection and Disruption System was developed with federal funds and is assigned to the United States Government. Licensing and technical inquiries may be directed to the Office of Patent Counsel, Space and Naval Warfare Systems Center, San Diego, Code 20012, San Diego, Calif., 92152; telephone (619) 553-3201, facsimile (619) 553-3821. Reference Navy Case No. 84690.

BACKGROUND OF THE INVENTION

The embodiments of the invention relate generally to the field of object detection and disruption systems.

Passive acoustic sensors deployed on the ocean bottom have been used to detect passing objects, such as submarines. These sensors have historically been cabled to shore facilities where human operators separate out the submarine signatures from the noise. Recently, the technique of submarine quieting has minimized the effectiveness of this approach. Further, the sole use of electric field sensors or magnetic field sensors is not optimal for modern submarine classification due to the low-confidence detection capability.

Therefore, there is a current need for a system that may more accurately detect, localize, and classify aquatic objects such as submarines.

DETAILED DESCRIPTION OF SOME EMBODIMENTS

Figure 1:
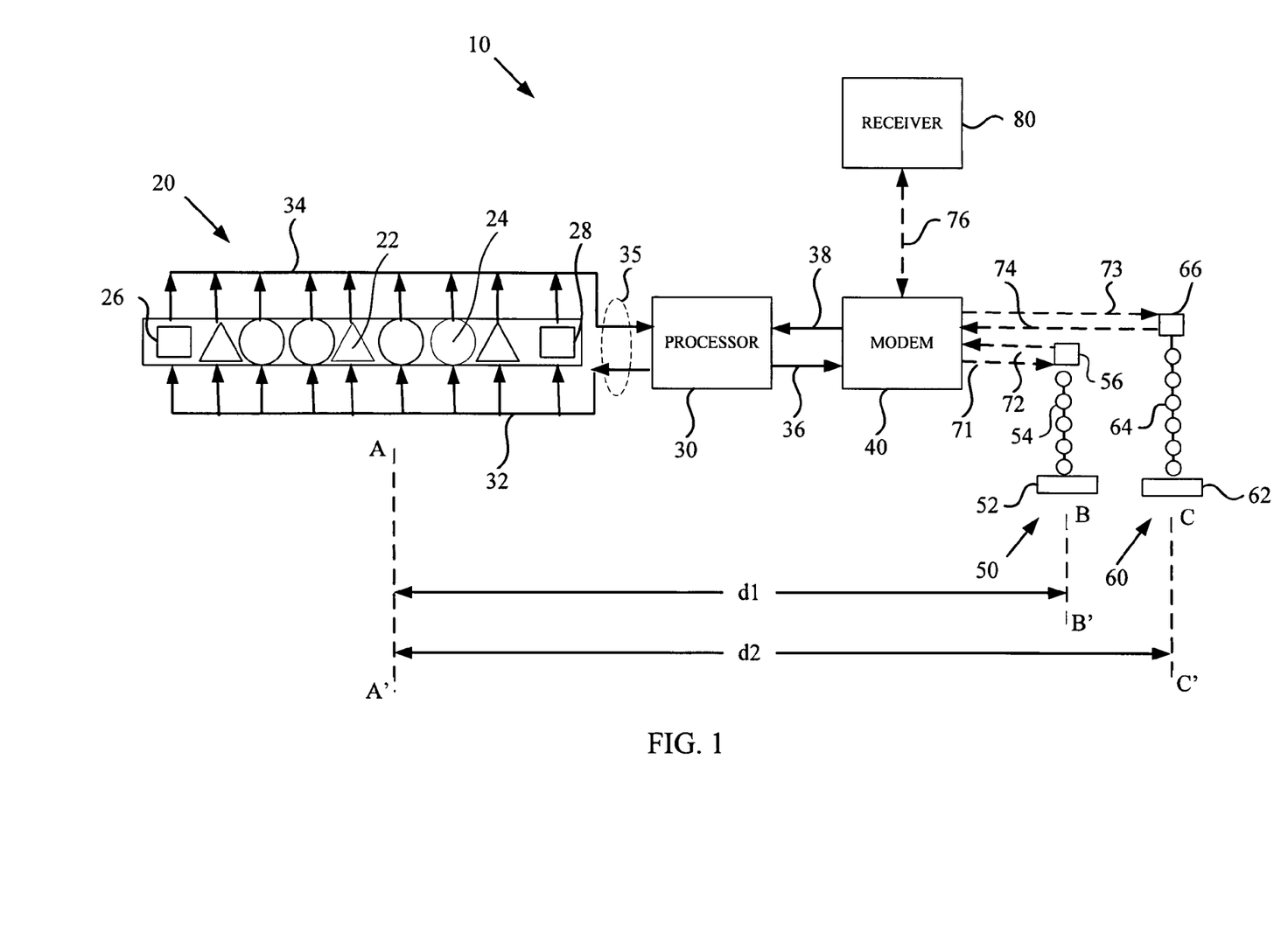
FIG. 1 illustrates a block diagram of an embodiment of the aquatic object detection and disruption system.

Referring to FIG. 1, there is shown a block diagram of an embodiment of the aquatic object detection and disruption system 10. System 10 includes a receive line array 20, a processor 30, a telesonar modem 40, a detection line array 50 and a disruption line array 60. Receive line array 20 may detect an object and transmit a receive line array signal representing such detection to processor 30. Processor 30 may process the receive line array signal and generate a detonation signal that is transmitted to telesonar modem 40. Telesonar modem 40 may transmit the detonation signal to detection line array 50 to detonate detection line array 50. In response to a signal received from a user of system 10, telesonar modem 40 may also transmit a detonation signal to disruption line array 60 to detonate disruption line array 60. Telesonar modem 40 can route the user-initiated detonation signal through processor 30 or can transmit the user-initiated detonation signal directly to disruption line array 60. One implementation of system 10 may be deployed in less than 1000 feet of water to maximize detection and disruption capabilities. However, advances in technology may allow system 10 to be deployed in deeper water with no loss in accuracy of detection and effectiveness of disruption of an object. One embodiment of system 10 is partially enclosed within a capsule 170 (see FIG. 3) such that system 10 may be safely dropped from an airplane or helicopter into a desired region of the ocean or other body of water. However, other methods of delivering system 10 to a desired location may be used.

Receive line array 20 is turned on and off by processor 30 based on one or more signals 32 received from processor 30. Processor 30 may send signals 32 to turn on each sensor 22 or hydrophone 24 individually, or may send one signal 32 to turn on all sensors 22 and/or all hydrophones 24 at the same time. Processor 30 receives one or more signals 38 from telesonar modem 40, which acts in response to one or more signals (not shown) received from a remote user of system 10. Receive line array 20 includes one or more sensors 22 and one or more hydrophones 24. One embodiment of system 10 may include multiple sensors 22 and multiple hydrophones 24. Sensors 22 may comprise electric field sensors, magnetic field sensors, electromagnetic sensors, or other sensors as would be recognized by one with ordinary skill in the art. Sensors 22 and hydrophones 24 may be oriented in a linear array with respect to processor 30 and telesonar modem 40. However, other arrangements of sensors 22 and hydrophones 24 are possible within receive line array 20. By way of example, receive line array 20 may include four electric field or magnetic field sensors 22 and twelve hydrophones 24, with sensors 22 evenly distributed among hydrophones 24. However, receive array 20 may contain fewer or more sensors 22 and/or hydrophones 24, with sensors 22 and hydrophones 24 arranged in any sequence within receive line array 20, and still remain within the scope of system 10. For example, in another embodiment, all of sensors 22 may be grouped together and all of hydrophones 24 may be grouped together within receive line array 20. In other embodiments, sensors 22 may be located outside of receive line array 20 and may acoustically or optically communicate with processor 30 and telesonar modem 40.

When deployed in the ocean or other body of water, the particular orientation of receive line array 20 with respect to processor 30 and telesonar modem 40 may be determined by processor 30 from one or more signals 38 received from telesonar modem 40. Telesonar modem 40 utilizes one or more signals 34 from receive line array 20 (transmitted via signal 36 from processor 30), one or more signals 72 from detection line array 50, and/or one or more signals 74 from disruption line array 60 to determine the orientation of receive line array 20. The orientation of receive line array 20 with respect to processor 30 and telesonar modem 40 is used to assist with the calculations of the locations and bearings of detected aquatic objects.

Hydrophones 24 may be used to detect acoustic signals (not shown) reflected from an underwater object, such as a ship or submarine. Such acoustic signals may be formed as a result of the detonation of detection line array 50 in the vicinity of an underwater object, which creates a sound field that may come into contact with and reflect from the underwater object. Hydrophones 24 may comprise beamforming hydrophones to increase detection capabilities. Hydrophones 24 may utilize quartz, piezoelectric ceramic materials, barium titanate, or other materials as recognized in the art to produce a desired acoustic sensitivity range. An example of a hydrophone that is suitable within receive line array 20 is the AQ-4 hydrophone manufactured by the Teledyne Benthos company, which has a sensitivity of −201 dbv re 1 uPA @ 20 C, a frequency response of 1 Hz-15 kHz+/−1.5 dB, a capacitance of 2.4 nF @ 20 C, and a maximum depth capability of 3320 M.

Receive line array 20 may further include a depth sensor 26 and a temperature sensor 28 coupled thereto. Depth sensor 26 and temperature sensor 28 may be controlled by signals 32 received from processor 30. Depth sensor 26 and temperature sensor 28 may also generate output signals 34 that are transmitted to processor 30. Depth sensor 26 may determine the depth of receive line array 20. The method for determining the depth of receive line array 20 may vary depending on the type of depth sensor used. Temperature sensor 28 is used to determine the temperature of the ocean water surrounding system 10. The temperature of the ocean water is used by processor 30 to determine the speed sound travels in the water. Processor 30 uses the determined speed of sound in the water as part of its calculation to determine the spatial distance d1 between detection line array 50 and receive line array 20. An example of distance d1 is the distance between axis A-A' and B-B' as shown. Axis A-A' may represent a centerline axis of receive line array 20. Axis B-B' may represent a centerline axis of detection line array 50. Processor 30 additionally uses the speed of sound in the water as part of its calculation to determine the spatial distance d2 between detection line array 60 and receive line array 20. An example of distance d1 is the distance between lines A-A' and C-C' as shown. Axis C-C' may represent a centerline axis of disruption line array 60. Distances d1 and d2 may vary depending on the precise location on receive line array 20, detection line array 50, and/or disruption line array 60 from which measurements are taken. For example, distance d1 may be measured from the edge of base 52 nearest to telesonar modem 40 to the edge of receive line array 20 nearest to processor 30. Alternatively, distance d1 may be measured from the edge of base 52 furthest from telesonar modem 40 to the edge of receive line array 20 furthest from processor 30.

Processor 30 is operatively connected to receive line array 20. Sensors 22 and hydrophones 24 each produce an output signal 34 that is transmitted to processor 30. Processor 30 uses signals 34 to determine if a particular object has been sensed. This determination can be made by processor 30 utilizing a lookup table, comparing signals 34 with a detection threshold or values stored within a database, or other suitable technique as recognized in the art. Processor 30 may send signals 32 to receive line array 20 and receive signals 34 from receive line array 20. Signals 32 may be transmitted to all sensors 22 and hydrophones 24, or may be transmitted to a particular sensor 22 or hydrophone 24. Similarly, signals 34 may be transmitted from each sensor 22 and hydrophone 24, or may be transmitted from a particular sensor 22 or hydrophone 24. In one embodiment, sensors 22 and hydrophones 24 may each be interconnected. In another embodiment, each sensor 22 and each hydrophone 24 may be connected to a data bus 35 connected to processor 30. In one implementation of system 10, data bus 35 may comprise a combination of signals 32 and signals 34. Signals 32 and 34 may be implemented as electrical signals, but may also comprise other signals such as optical or radio frequency signals. Processor 30 may also include memory operatively connected thereto. Processor 30 may be implemented as a standard programmable digital electronic component residing on or within an integrated circuit.

Processor 30 may store various information received from receive line array 20 or telesonar modem 40, as well as other information and/or software necessary for use by processor 30. An embodiment of system 10 may include a processor 30 that develops a detection report (not shown) based on the characteristics of signals 34 received from receive line array 20. The detection report may contain information received by sensors 22 and/or hydrophones 24. The detection report may be sent by telesonar modem 40 via a signal 76 to a receiver 80 on a nearby ship, submarine, aircraft, or on-shore facility (not shown). The detection report may be evaluated by a user of system 10 to determine the proper course of action with regard to a detected object. In other embodiments, the detection report may be transmitted such that it can be evaluated by a computer located on a nearby ship, submarine, aircraft, or on-shore facility.

Telesonar modem 40 is connected to and may be controlled by processor 30. Telesonar modem 40 may be configured to be in an "on" state when deployed, or may be configured to be remotely turned on and off at a predetermined time. Processor 30 may transmit signals 36 to telesonar modem 40 and receive signals 38 from telesonar modem 40. Signals 36 and 38 may comprise electrical signals. However, as an example, signals 36 and 38 may be optical signals transmitted via laser through a fiber optic cable connection with processor 30 or may be radio frequency signals communicated via a transceiver. An example of a telesonar modem 40 that is suitable within system 10 is the ATM-887 telesonar modem manufactured by the Teledyne Benthos company, which has a directional or omnidirectional integral transducer, operates at a baud rate of 150 bps to 15,360 bps, may operate between 9 kHz and 32 kHz, and has a maximum depth capability of 6000 meters.

One use of telesonar modem 40 is to determine the distance d1 of detection line array 50 from receive line array 20 and the distance d2 of disruption line array 60 from receive line array 20. To determine d1 and d2, telesonar modem 40 may send time monitored and coded acoustical probing signals (not shown) to processor 30, detection line array 50, and disruption line array 60. The acoustical probing signals may be time monitored by processor 30 through the use of an internal clock within processor 30. Time monitoring may occur by processor 30 setting a time value equal to zero when a signal is transmitted, incrementing the time value during the transmission of the signal, and by recording a time value when a signal is received by processor 30 or telesonar modem 40. Detection line array 50 and disruption line array 60 may then send return time monitored and coded acoustical probing signals (not shown) to both telesonar modem 40 and hydrophones 24. The return time monitored and acoustical probing signals transmitted by detection line array 50 and disruption line array 60 to telesonar 40 may be forwarded to processor 30. When the return time monitored and coded acoustical probing signals transmitted by detection line array 50 and disruption line array 60 to hydrophones 24 are received at hydrophones 24, these signals may be sent to processor 30 wherein they are compared with the return time monitored and coded acoustical probing signals sent from detection line array 50 and disruption line array 60 to telesonar modem 40 and forwarded to processor 30. Based on the time comparisons, along with the previously determined locations of processor 30 with respect to receive line array 20 and telesonar modem 40, processor 30 may determine the location of detection line array 50 and disruption line array 60 with respect to receive line array 20. The physical location of detection line array 50 in relation to receive line array 20 is used to determine a precise location and bearing of an aquatic object. The location and bearing of the object, along with the known location of receive line array 20, detection line array 50, and disruption line array 60, may enable a user to timely detonate disruption line array 60 to disrupt the object's activities.

Detection line array 50 and disruption line array 60 may be implemented as explosive line arrays, having explosive charges 54 and 64 respectively connected thereto. Detection line array 50 may contain an electronics package 56 that may receive signals 71 sent from telesonar modem 40 as well as other components of system 10, and may transmit signals 72 to telesonar modem 40 and other components of system 10. Disruption line array 60 may contain an electronics package 66 that may receive signals 73 sent from telesonar modem 40 as well as other components of system 10, and may transmit signals 74 to telesonar modem 40 and other components of system 10. The signals 73 sent from telesonar modem 40 to disruption line array 60 may be user-initiated detonation signals. The user-initiated detonation signals may be electrical, acoustic, or wireless signals sent from a user of system 10 to telesonar modem 40 via a wired or wireless connection. Electronics package 56 may be positioned anywhere along detection line array 50. As an example, electronics package 56 may be positioned near the top of detection line array 50. Electronics package 66 may be positioned anywhere along disruption line array 60. As an example, electronics package 66 may be positioned near the top of disruption line array 60.

In one embodiment, signals 71-74 may comprise acoustic signals. In other embodiments, signals 71-74 may comprise optical or electrical signals. Detection line array 50 and disruption line array 60 may be unconnected to each other, but may also be connected via a wired or wireless connection for communication or other purposes. Detection line array 50 may contain a plurality of explosive charges 54 connected thereto. Similarly, disruption line array 60 may contain a plurality of explosive charges 64 connected thereto. Detection line array 50 may contain fewer explosive charges 54 than the number of explosive charges 64 connected to disruption line array 60. Detection line array 50 may contain a base 52 and disruption line array 60 may contain a base 62 to help stabilize and properly orient detection line array 50 and disruption line array 60 within a body of water. Other embodiments of detection line array 50 and disruption line array 60 may contain buoyant objects (not shown) coupled to the upper regions thereof, to further help stabilize and properly orient detection line array 50 and disruption line array 60 within a body of water.

Explosive charges 54 may be detonated via one or more signals 71 sent from telesonar modem 40. Explosive charges 64 may be detonated via one or more signals 73 sent from telesonar modem 40. In one embodiment of system 10, upon receipt of signals 71 or 73, electronics package 56 or 66, respectively, may send a detonation signal (not shown) to detonate a particular explosive charge 54 or 64. If electronics packages 56 and 66 may be capable of transmitting and receiving acoustic signals, the detonation signal can be an acoustic signal. In another implementation, explosive charges 54 and 64 may receive a detonation signal directly from telesonar modem 40. In another embodiment of system 10, the detonation of one explosive charge 54 or 64 may set off a chain reaction that may detonate the remaining explosive charges 54 or 64. In other embodiments, explosive charges 54 and 64 may be separately detonated using a predetermined sequence at predetermined time intervals to produce a desired sound/energy field. For example, explosive charges 54 may be detonated in a particular sequence to produce a cone-shaped sound/energy field that offers the maximum capability of object detection, while explosive charges 64 may be detonated in a different sequence to produce a narrow and highly-focused sound/energy field that may effectively disrupt an object's activities.

Figure 2:
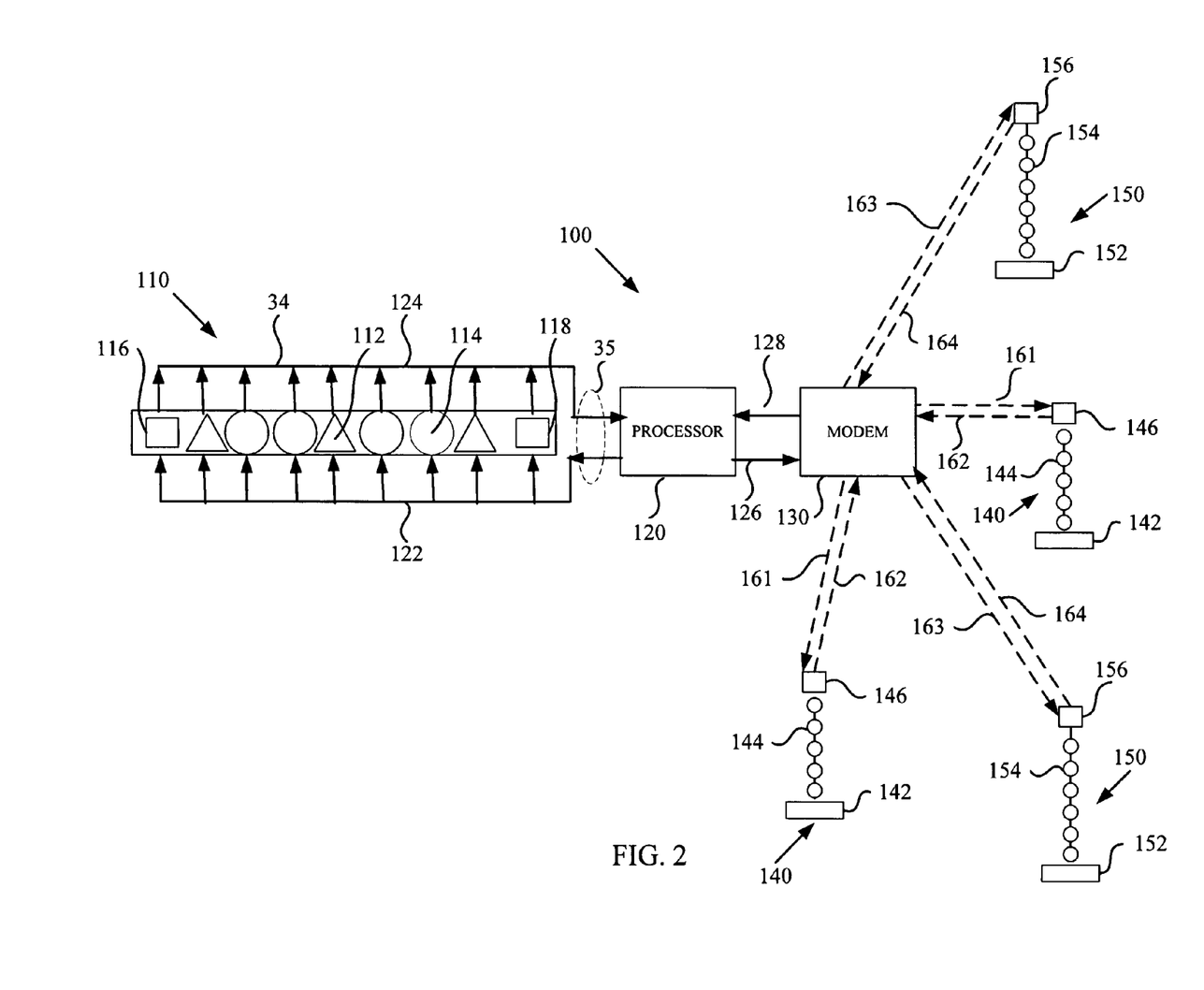
FIG. 2 illustrates a block diagram of another embodiment of the aquatic object detection and disruption system.

Referring to FIG. 2, there is shown a block diagram of another embodiment of the aquatic object detection and disruption system 100. System 100 includes a receive line array 110, a processor 120, a telesonar modem 130, a plurality of detection line arrays 140, and a plurality of disruption line arrays 150. Receive line array 120 may include a plurality of sensors 112, a plurality of hydrophones 114, a depth sensor 116, and a temperature sensor 118. Receive line array 110 may receive signals 122 from processor 120 and may transmit signals 124 to processor 120. Processor 120 may transmit signals 126 to telesonar modem 130 and may receive signals 128 from telesonar modem 130. Detection line arrays 140 communicate with telesonar modem 130 via signals 161 and 162, which may be acoustic or optical signals. Disruption line arrays 150 communicate with telesonar modem 130 via signals 163 and 164, which may be acoustic or optical signals.

Receive line array 110, processor 120, telesonar modem 130, detection line arrays 140, and disruption line arrays 150 may be implemented with the same structure and function as receive line array 20, processor 30, telesonar modem 40, detection line array 50, and disruption line array 60 of system 10. Processor 120 and telesonar modem 130 may further contain additional signal transmission and processing capability, in the form of software and/or hardware, to increase the transmission and processing of the various signals to the various components of system 100. The use of multiple detection line arrays 140 and disruption line arrays 150 in system 100 allows for the detection and disruption of aquatic objects over a broader region of the ocean or other body of water than allowed by system 10. The spacing of detection line arrays 140 and disruption line arrays 150 from receive line array 120, processor 130, and telesonar modem 140 may vary depending on the transmission capabilities of telesonar modem 140 and electronics packages 146 and 156.

Figure 3:
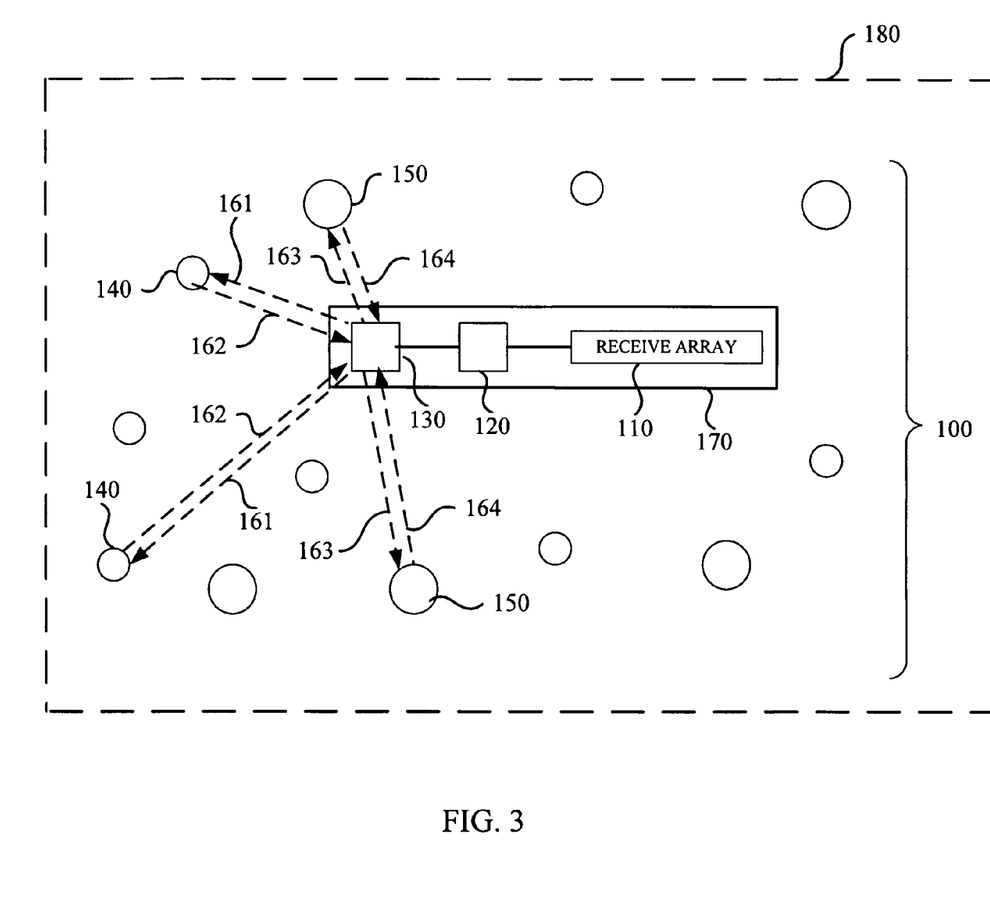
FIG. 3 illustrates a block diagram of an embodiment of the aquatic object detection and disruption system deployed within the ocean.

Referring to FIG. 3, there is shown a block diagram plan view of system 100, including receive line array 110, processor 120, telesonar modem 130, detection line arrays 140, and disruption line arrays 150, deployed within the ocean 180. As an example, system 100 may be deployed in less than 1000 feet of water to maximize detection and disruption capabilities. However, some embodiments of system 100 may be deployed in deeper water with no loss in accuracy of detection and effectiveness of disruption of an object. In one implementation, detection line arrays 140 and disruption line arrays 150 are may be located within a 5-25 foot radius of receive line array 110. The distance and angular orientation of detection line arrays 140 and disruption line arrays 150 with respect to receive line array 110 is determined by processor 120 from acoustic signals (not shown) received from telesonar modem 130, receive line array 110, detection line arrays 140, and disruption line arrays 150. System 100 may also include a capsule 170 for containing various components of system 100. By way of example, capsule 170 may contain receive line array 110, processor 120, and telesonar modem 130 as shown. Capsule 170 may be comprised of a durable polymer based material. Capsule 170 may be oblong in shape, but the shape of capsule 170 may vary in design depending on the design of receive line array 110, processor 120, telesonar modem 130, and any other components of system 100 located within capsule 170. Capsule 170 may be utilized to facilitate the deployment receive line array 110, processor 120 and telesonar modem 130 and to protect such components from damage during use of system 100.

Figure 4A:
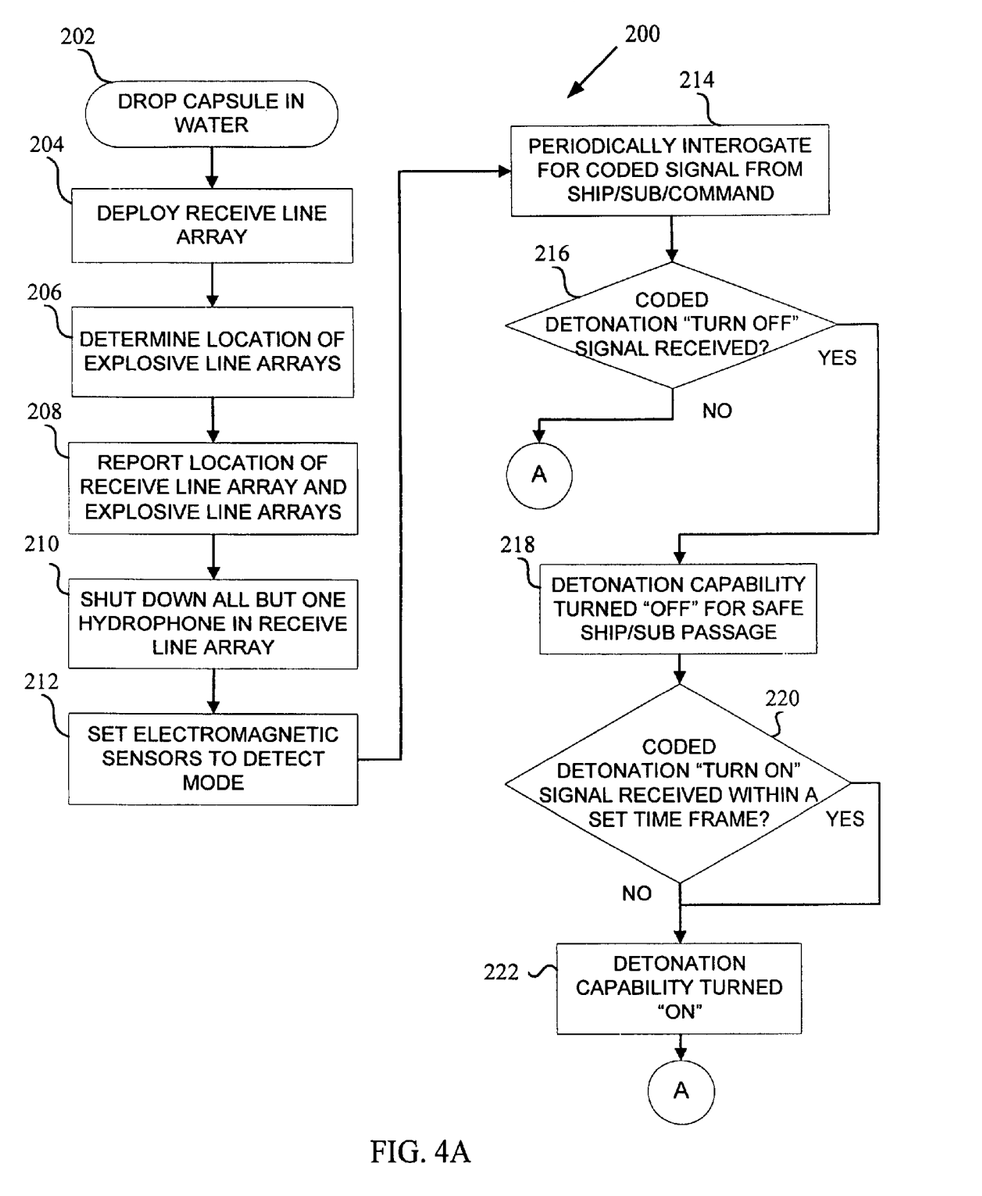
FIG. 4A illustrates a flow diagram of a method of operation of an embodiment of the aquatic object detection and disruption system.

Referring to FIG. 4A, there is shown a flow diagram of selected steps of the method of operation 200 of an embodiment of the aquatic object detection and disruption system. By way of example, method of operation 200 will be discussed with reference to system 10. Method 200 begins with step 202, wherein system 10 is deployed into the ocean. One embodiment of system 10 may be designed such that system 10 sinks to the bottom of the body of water and may operate therefrom. Other embodiments of system 10 may allow system 10 to operate while floating at a predetermined depth level within the body of water. Next, step 204 involves deploying receive line array 20. In one embodiment, this step may be accomplished by inflating the cavity wherein receive line array 20 resides. Step 206 involves determining the location of detection line array 50 and disruption line array 60. These locations may be determined by use of telesonar modem 40 as described above. Next, step 208 involves reporting the location of receive line array 20, detection line array 50, and disruption line array 60 to a user of system 10, via telesonar modem 40. Following step 208, step 210 involves shutting down all but one hydrophone 24 in receive line array 30. Step 210 allows system 10 to conserve power and still maintain the ability to detect acoustic signals from various objects. Step 212 involves setting sensors 22 to detect mode so objects may be detected.

Next, step 214 involves processor 30 periodically interrogating telesonar modem 40 for coded signals (not shown) from a ship, submarine, aircraft, command center, or other command facility. This interrogation can be accomplished by processor 30 sending signals 36 to telesonar modem 40. Step 216 involves determining whether a coded detonation "turn off" signal from a ship, submarine, aircraft, or command center has been received by telesonar modem 40. If not, method 200 proceeds to step 224. If a coded detonation "turn off" signal has been received by telesonar modem 40, method 200 proceeds to step 218, wherein the detonation capability of detection line array 50 and disruption line array 60 is turned "off" to allow safe passage of a ship, submarine, or other aquatic object. By way of example, the process of the detonation capability being turned off may be achieved by processor 30 sending a signal 36 to prevent telesonar modem 40 from transmitting signals 71 to detection line array 50 and/or signals 73 to disruption line array 60. Step 220 involves determining whether a coded detonation "turn on" signal has been received by telesonar modem 40 from a ship, submarine, aircraft, or command center within a set time frame. The time frame may be calculated based upon the average time it takes for a ship, submarine, or other aquatic object to travel within range and out of range of detection line array 50 and/or disruption line array 60. By way of example, the time frame may range from about five to fifteen minutes. The coded detonation "turn on" signal indicates that the ship, submarine, or other object is no longer in the vicinity of system 10, thus allowing detonation capabilities to be turned back on.

If the coded detonation "turn on" signal has been received by telesonar modem 40, step 222 involves turning on the detonation capabilities of system 10. By way of example, the detonation capability may be turned back "on" by processor 30 sending a signal 36 to allow telesonar modem 40 to transmit signals 71 to detection line array 50 and/or signals 73 to disruption line array 60. Processor 30 may have a built-in timer (not shown) to enable processor 30 to send the signal 36 at the appropriate time. If the coded detonation "turn on" signal has not been received by telesonar modem 40 from a ship, submarine, aircraft, or command center within the set time frame, method 200 will automatically proceed to step 222 to turn detonation capabilities back on. The capability to automatically turn the detonation capabilities back on prevents the detonation capabilities from being left off due to inadvertent user error in not turning the detonation capabilities back on, or to protect against communication failure. Following step 222, method 200 proceeds to step 224, as shown in FIG. 4B.

Figure 4B:
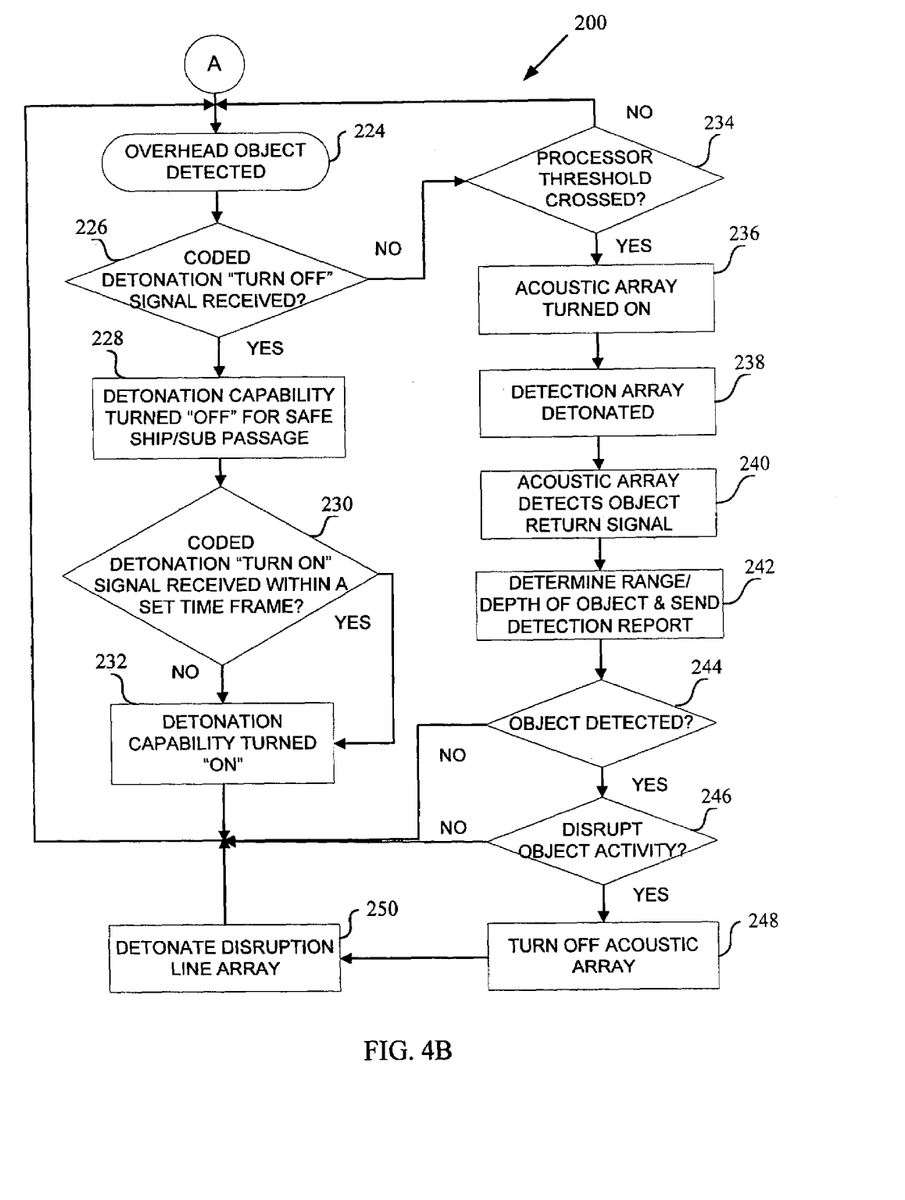
FIG. 4B illustrates a flow diagram of a method of operation of an embodiment of the aquatic object detection and disruption system.

Referring to FIG. 4B, there is shown a flow diagram of selected steps of the method of operation 200 of an embodiment of the aquatic object detection and disruption system. Method 200 continues from with step 224, wherein system 10 detects an overhead object. An object is detected when it is within the range of sensors 22. When an object is detected by one or more sensors 22, sensors 22 may send output signals 34 to processor 30, which may then transmit signals 36 containing such information to telesonar modem 40. Next, step 226 involves determining whether a coded detonation "turn off" signal has been received from a ship, submarine, aircraft, or command center. This interrogation can be accomplished by processor 30 sending signals 36 to telesonar modem 40. If a coded detonation "turn off" signal has been received by telesonar modem 40, method 200 proceeds to step 228, wherein the detonation capability of detection line array 50 and disruption line array 60 is turned "off" to allow safe passage of a ship, submarine, or other object. By way of example, the process of the detonation capability being turned off may be achieved by processor 30 sending a signal 36 to prevent telesonar modem 40 from transmitting signals 71 to detection line array 50 and/or signals 73 to disruption line array 60. Next, step 230 involves determining whether a coded detonation "turn on" signal has been received from a ship, submarine, aircraft, or command center within a set time frame. The time frame may be calculated based upon the average time it takes for a ship, submarine, or other object to travel within range and out of range of detection line array 50 and/or disruption line array 60. By way of example, the time frame may range from about five to fifteen minutes. The coded detonation "turn on" signal indicates that the ship, submarine, or other object is no longer in the vicinity of system 10, thus allowing detonation capabilities to be turned back on.

If the coded detonation "turn on" signal has been received, step 232 involves turning on the detonation capabilities of system 10. By way of example, the process of the detonation capability being turned on may be achieved by processor 30 sending a signal 36 to telesonar modem 40 to allow telesonar modem 40 to transmit signals 71 to detection line array 50 and/or signals 73 to disruption line array 60. Processor 30 may have a built-in timer (not shown) to enable processor 30 to send signal 36 at the appropriate time. If the coded detonation "turn on" signal has not been received within the set time frame, method 200 will automatically proceed to step 232 to turn detonation capabilities back on. The capability to automatically turn the detonation capabilities back on prevents the detonation capabilities from being left off due to inadvertent user error in not turning the detonation capabilities back on, or to protect against communication failure. Following step 232, method 200 returns back to step 224 to detect another object.

If, at step 226, a coded signal from a friendly ship, submarine, aircraft, or command center has not been received by telesonar modem 40, method 200 proceeds to step 234. At step 234 a determination is made by processor 30 whether or not the signal detected from the overhead object has crossed a detection threshold, thus indicating a sensed object. This determination can be accomplished by processor 30 comparing the detected signal with the detection threshold. By way of example, the detection threshold may be a voltage level stored in memory, a lookup table, a database, or other data storage medium. The detection threshold is predetermined based on the types of objects desired for detection. System 10 may contain more than one detection threshold, with the detection thresholds stored within memory 34. If processor 30 has determined that a desired detection threshold has not been crossed, method 200 returns to step 224. If the desired detection threshold has been crossed, method 200 proceeds to step 236, wherein all of hydrophones 24 in receive array 20 are turned on. Processor 30 can send a signal 32 to hydrophones 24 to turn them on. Next, step 238 involves the detonation of detection line array 50. This may be accomplished by telesonar modem 40 sending a signal 71 to detection line array 50 to detonate explosive charges 52. Step 240 involves hydrophones 24 detecting the acoustic object return signal (not shown). Based on this information, step 242 next involves processor 30 determining the range and depth of the sensed object and then causing telesonar modem 40 to send a detection report containing such information to receiver 80 via signal 76.

Next, step 244 involves determining whether a foreign object has been detected. This determination is made by the user of system 10 analyzing the detection report. If a user has determined that a foreign object has not been detected, method 200 returns to step 224. If a user determines that a foreign object has been detected, step 246 involves the user of system 10 determining whether or not to disrupt the activity of the object. If the user makes a decision not to disrupt the object's activity, method 200 returns to step 224. If a decision is made to disrupt the object's activity, step 248 involves turning "off" the array of hydrophones 24 by processor 30 sending a signal 32 to hydrophones 24. Step 248 helps prevent against damage of hydrophones 24 during the detonation of disruption line array 60. Next, step 250 involves a user detonating disruption line array 60. Step 250 may occur by a signal (not shown) transmitted from the nearby ship, submarine, aircraft, or on-shore command center to telesonar modem 40, which then transmits a signal 73 to disruption line array 60. After the detonation has occurred, method 200 returns to step 224, wherein another object may be detected.

The described embodiments are to be considered as illustrative and not restrictive. The invention is not limited to the particular embodiments described, but is capable of many embodiments with variations, modifications, and applications different than those described, without departing from the scope of the following claims.

We claim:

1. An object detection and disruption system comprising:
   a receive line array that that generates one or more receive line array signals, the receive line array having more than one sensors and more than one hydrophones;
   a processor operatively connected to the receive line array to process at least one of the one or more receive line array signals and to generate one or more detonation signals based upon the at least one processed receive line array signal; and
   a modem operatively connected to the processor that transmits the one or more detonation signals to one or more explosive line arrays operatively connected to the modem and detached from the receive line array, the one or more explosive line arrays having more than one explosive charges coupled thereto that is detonated upon receipt of the one or more detonation signals.

2. The object detection and disruption system of claim 1, wherein the processor generates one or more detonation signals if the processed receive line array signal indicates the detection of an object.

3. The object detection and disruption system of claim 1, wherein the receive line array contains a plurality of hydrophones and a plurality of sensors, the plurality of hydrophones existing greater in number than the plurality of sensors.

4. The object detection and disruption system of claim 1, wherein the one or more explosive line arrays is a detection line array, the detection line array having a plurality of explosive charges coupled thereto.

5. The object detection and disruption system of claim 4 further comprising one or more disruption line arrays operatively connected to the modem, the one or more disruption line arrays each having a plurality of explosive charges coupled thereto, wherein the modem is configured to receive one or more user-initiated detonation signals and transmit at least one of the one or more user-initiated detonation signals to at least one of the one or more disruption line arrays to detonate at least one of the plurality of explosive charges coupled thereto.

6. The object detection and disruption system of claim 1, wherein the one or more explosive line arrays is a disruption line array, the disruption line array having a plurality of explosive charges coupled thereto.

7. The object detection and disruption system of claim 1, wherein the one or more explosive line arrays is in wireless communication with the modem.

8. The object detection and disruption system of claim 1, wherein the receive line array further includes a depth sensor coupled thereto.

9. The object detection and disruption system of claim 1, wherein the receive line array further includes a temperature sensor coupled thereto.

10. The object detection and disruption system of claim 1, wherein the one or more sensors is a sensor selected from the group of sensors consisting of an electric field sensor, a magnetic field sensor, and an electromagnetic sensor.

11. The object detection and disruption system of claim 1, wherein the receive line array signal is generated by the one or more sensors.

12. The object detection and disruption system of claim 1, wherein the receive line array signal is generated by the one or more hydrophones.

13. An object detection and disruption system comprising:
   a receive line array that that generates one or more receive line array signals the receive line array having a plurality of sensors and a plurality of hydrophones, the plurality of sensors and the plurality of hydrophones aligned in a substantially linear array;
   a processor operatively connected to the receive line array to process at least one of the one or more receive line array signals and to generate one or more detonation signals based upon the at least one processed receive line array signal; and
   a modem operatively connected to the processor that transmits the one or more detonation signals to one or more detection line arrays operatively connected to the modem and one or more disruption line arrays operatively connected to the modem, the one or more detection line arrays being detached from the receive line array, the one or more detection line arrays and the one or more disruption line arrays each having more than one explosive charges coupled thereto that is detonated upon receipt of at least one of the one or more detonation signals.

14. The object detection and disruption system of claim 13, wherein the one or more detection line arrays and the one or more disruption line arrays are explosive line arrays each containing a plurality of explosive charges coupled thereto.

15. The object detection and disruption system of claim 13, wherein the receive line array further includes a temperature sensor and a depth sensor coupled thereto.

16. The object detection and disruption system of claim 13, wherein the plurality of sensors are sensors selected from the group of sensors consisting of electric field sensors, magnetic field sensors, and electromagnetic sensors.

17. The object detection and disruption system of claim 13, wherein the one or more detection line arrays and the one or more disruption line arrays are in wireless communication with the modem.

18. The object detection and disruption system of claim 13, wherein the modem is configured to receive one or more user-initiated detonation signals and transmit at least one of the one or more user-initiated detonation signals to at least one of the one or more disruption line arrays to detonate at least one of the more than one explosive charges coupled thereto.

19. The object detection and disruption system of claim 1, wherein the receive line array, the processor, and the modem are contained within a capsule.

20. A method comprising the steps of:
    deploying a system into a body of water, the system having a telesonar modem, a receive line array, a detection line array, and a disruption line array, the detection line array and disruption line array being physically detached from the receive line array, the receive line array having more than one hydrophones and more than one electromagnetic sensors, the disruption line array having more than one explosive charges coupled thereto;
    detecting an object in the body of water using the receive line array; and
    disrupting the activity of the detected object by detonating the more than one explosive charges.

21. The method of claim 20, wherein the step of detecting an object in the body of water using the receive line array includes the steps of:
    detecting a signal of an object using the electromagnetic sensors;
    determining that the detected signal has crossed a detection threshold level;
    activating the more than one hydrophones and detonating the detection line array such that an acoustic signal is returned from the object;
    detecting the acoustic signal returned from the object; and
    determining than an object has been detected.

22. The method of claim 20 further comprising, before the step of determining than an object has been detected, the steps of determining range and depth of the object in the body of water and transmitting the range and depth of the object to a user of the system via the telesonar modem.

23. The method of claim 22, wherein the step of determining than an object has been detected is performed by the user of the system based on the acoustic signal returned from the object and the range and depth of the object.

24. The method of claim 20 further comprising the steps of:
    periodically interrogating the telesonar modem for one or more coded signals;
    determining that a coded detonation "turn off" signal has been received by the telesonar modem; and
    inactivating the detonation capability of the detection line array and the disruption line array.

25. The method of claim 24 further comprising the steps of:
    determining that a coded detonation "turn on" signal has been received by the telesonar modem within a set time frame; and
    activating the detonation capability of the detection line array and the disruption line array.

* * * * *